(12) United States Patent
Hsieh et al.

(10) Patent No.: US 7,876,401 B2
(45) Date of Patent: Jan. 25, 2011

(54) METHOD FOR MANUFACTURING A LIQUID CRYSTAL DISPLAY USING A POLYMER STABILITY ALIGNMENT PROCESS WITH A SEALANT PRE-CURING PROCESS

(75) Inventors: Chung-Ching Hsieh, Hsin-Chu (TW);
Chih-Ho Chiu, Hsin-Chu (TW);
Mei-Shiou Lin, Hsin-Chu (TW);
Chia-Hsuan Pai, Hsin-Chu (TW);
Te-Sheng Chen, Hsin-Chu (TW);
Sugiura Norio, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 111 days.

(21) Appl. No.: 12/104,453

(22) Filed: Apr. 17, 2008

(65) Prior Publication Data

US 2009/0111349 A1    Apr. 30, 2009

(30) Foreign Application Priority Data

Oct. 24, 2007    (TW) ............................. 96139903 A

(51) Int. Cl.
  *G02F 1/1333*    (2006.01)
  *G02F 1/13*      (2006.01)
  *G02F 1/1339*    (2006.01)
(52) U.S. Cl. ................ 349/88; 349/187; 349/190
(58) Field of Classification Search ............... 349/86, 349/88, 187, 190

See application file for complete search history.

(56) References Cited

U.S. PATENT DOCUMENTS

| 7,528,904 B2 * | 5/2009 | Masutani et al. ............. 349/92 |
| 2003/0160210 A1 | 8/2003 | Bremer |
| 2004/0011996 A1 | 1/2004 | Klasen-memmer |
| 2005/0018105 A1 * | 1/2005 | Inoue et al. .................. 349/93 |
| 2005/0116200 A1 | 6/2005 | Nakanishi |
| 2005/0136196 A1 * | 6/2005 | Kataoka ..................... 428/1.1 |
| 2005/0264737 A1 | 12/2005 | Kataoka |
| 2006/0092371 A1 * | 5/2006 | Motomatsu ................. 349/189 |
| 2006/0210725 A1 | 9/2006 | Fujita |
| 2006/0250564 A1 * | 11/2006 | Eshleman ................... 349/153 |
| 2007/0008481 A1 * | 1/2007 | Makimoto ................... 349/187 |

FOREIGN PATENT DOCUMENTS

| CN | 1696774 A | 11/2005 |
| CN | 101054505 A | 10/2007 |
| TW | M290570 | 5/2006 |

* cited by examiner

*Primary Examiner*—David Nelms
*Assistant Examiner*—Paul C Lee
(74) *Attorney, Agent, or Firm*—Winston Hsu; Scott Margo

(57) ABSTRACT

A method for manufacturing LCD includes providing a bottom substrate, applying a sealant on its top surface, providing a liquid crystal mixture including a vertical alignment liquid crystal material and at least one reactive monomer which are surrounded by the sealant, providing a top substrate so that its bottom surface covers the sealant and the bottom substrate, performing a pre-curing process to pre-cure the sealant under a first temperature, and performing an active curing process under a second temperature, wherein the second temperature is higher than the first temperature.

20 Claims, 8 Drawing Sheets

METHOD FOR MANUFACTURING A LIQUID CRYSTAL DISPLAY USING A POLYMER STABILITY ALIGNMENT PROCESS WITH A SEALANT PRE-CURING PROCESS

BACKGROUND OF THE INVENTION

1. Field of the Invention

The present invention relates to a method for manufacturing a liquid crystal display, and more particularly, to a method for manufacturing a liquid crystal display comprising a liquid crystal mixture having a high melting point.

2. Description of the Prior Art

With progression of large-sized liquid crystal displays (LCDs), a requirement for wider viewing angle is confronted. Therefore the multi-domain vertical alignment (MVA) LCD, which possesses advantages such as wider viewing angle and shorter response time, has become a mainstream of the large-sized LCDs. To save time of dropping liquid crystal molecules, most of the large-sized LCDs use a new method, which is called one drop fill (ODF) process, to fill the space between a top substrate and a bottom substrate with liquid crystal molecules. The one drop fill process coats a sealant on the surface of glass substrate. Then, the liquid crystal molecules are directly dropped on the glass substrate. Next, the combination of the top and bottom glass substrate is performed to cure the sealant by the curing process, such as lighting or heating, so as to fix the top and bottom glass substrates together. The manufacture of the LCD is finished. This kind of new process can largely save the time of dropping the liquid crystal molecules and the quantity of the liquid crystal materials, especially for the extra large-sized display.

In a conventional MVA LCD, a protrusion is utilized to make the liquid crystal molecules have a pre-tilt angle. Therefore processes such as thin film deposition, photolithography process, and etching process are needed to form the protrusion, and thus complexity and cost of the fabrication are increased. More serious, the protrusion shades light, reduces aperture ratio of the pixel, and reduces brightness of the LCD. Therefore, the ordinary skilled person in the art provides a polymer stability alignment (PSA) process, also called phase separation alignment (PSA) process, to replace the protrusion so as to make the molecules have pre-tilt angle in the MVA LCD.

Generally, a liquid crystal mixture comprising the liquid crystal molecules and a reactive monomer is provided in the LCD during the polymer stability alignment process. After combining the top and bottom substrate of the LCD, a voltage is applied to tilt the liquid crystal molecules to a predetermined angle. Then, an ultraviolet (UV) light is provided to illuminate the LCD, so that polymerization and phase separation of the reactive monomer in the liquid crystal mixture is gradually caused along the aligned direction of the liquid crystal molecules to form polymers. Therefore, the liquid crystal molecules have a pre-tilt angle along the aligned direction of the liquid crystal molecules.

However, as the aforementioned, after finishing the combination of the top and bottom glass substrate and the filling of the liquid crystal mixture, the LCD also needs to undergo a curing process to cure the sealant between the top and bottom glass substrate. The UV light or the thermal energy applied during the sealant-curing process usually makes the reactive monomer have a phenomenon of deterioration or reaction before the polymer stability alignment process. Therefore, during the following polymer stability alignment process, the polymerization and the phase separation of the reactive monomer cannot be effectively caused to make the liquid crystal molecules have pre-tilt angle. Thus, the composition and the stability of the liquid crystal mixture are also affected, and some mura are further generated in the LCD, such as little bright point generated in displaying image.

According to the aforementioned, the research in the current technology has to be continued so as to provide a better method for manufacturing the LCD and effectively prevent from affecting the quality of the LCD resulted from the deterioration of the reactive monomer before the polymer stability alignment process in the prior art.

SUMMARY OF THE INVENTION

It is therefore a primary object of the claimed invention to provide a method for manufacturing an LCD so as to overcome the aforementioned problem of the mura of the LCD resulted from the deterioration of the reactive monomer during the curing process of the sealant.

According to the claimed invention, a method for manufacturing an LCD is provided. First, a bottom substrate is provided, and a sealant is applied on the top surface of the bottom substrate. Then, a liquid crystal mixture comprising a vertical alignment liquid crystal material and at least one reactive monomer is provided and surrounded by the sealant. Next, a top substrate is provided to cover the sealant and the bottom substrate with the bottom surface thereof. A pre-curing process is performed to pre-cure the sealant under a first temperature, and finally, an active curing process is performed to polymerize the reactive monomer under a second temperature, wherein the second temperature is higher than the first temperature.

The pre-curing process of the present invention, which is used to cure the sealant, is performed at the temperature for curing the reactive monomer. Therefore, the problem of causing the mura of the LCD by decomposing the reactive monomer having inferior thermal stability during curing process can be potentially prevented.

These and other objectives of the present invention will no doubt become obvious to those of ordinary skill in the art after reading the following detailed description of the preferred embodiment that is illustrated in the various figures and drawings.

DETAILED DESCRIPTION

According to the present invention, the presently used reactive monomer is easy to be deteriorated or have other chemical reaction when the presently used reactive monomer is heated to a thermal-curing temperature of aforementioned sealant. Therefore, the presently used reactive monomer has a problem of inferior thermal stability, so that the reactive monomer has no function during the polymer stability alignment process so as to cause mura of a liquid crystal display (LCD). The present invention provides choices for the materials of the reactive monomer and a method for manufacturing the LCD as a whole to improve the problem in the art.

Figure 1:
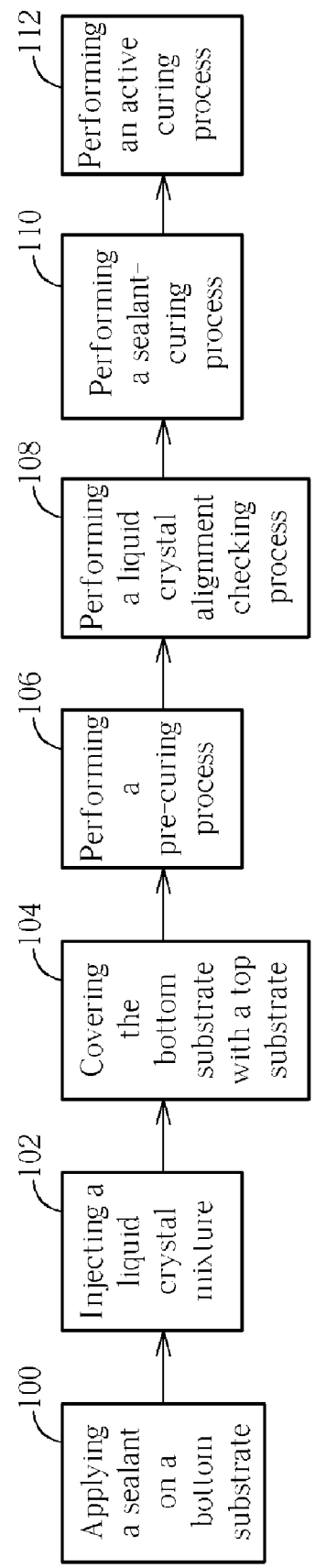
FIG. 1 is a flowchart of a method for manufacturing an LCD according to the present invention.
Figure 2:
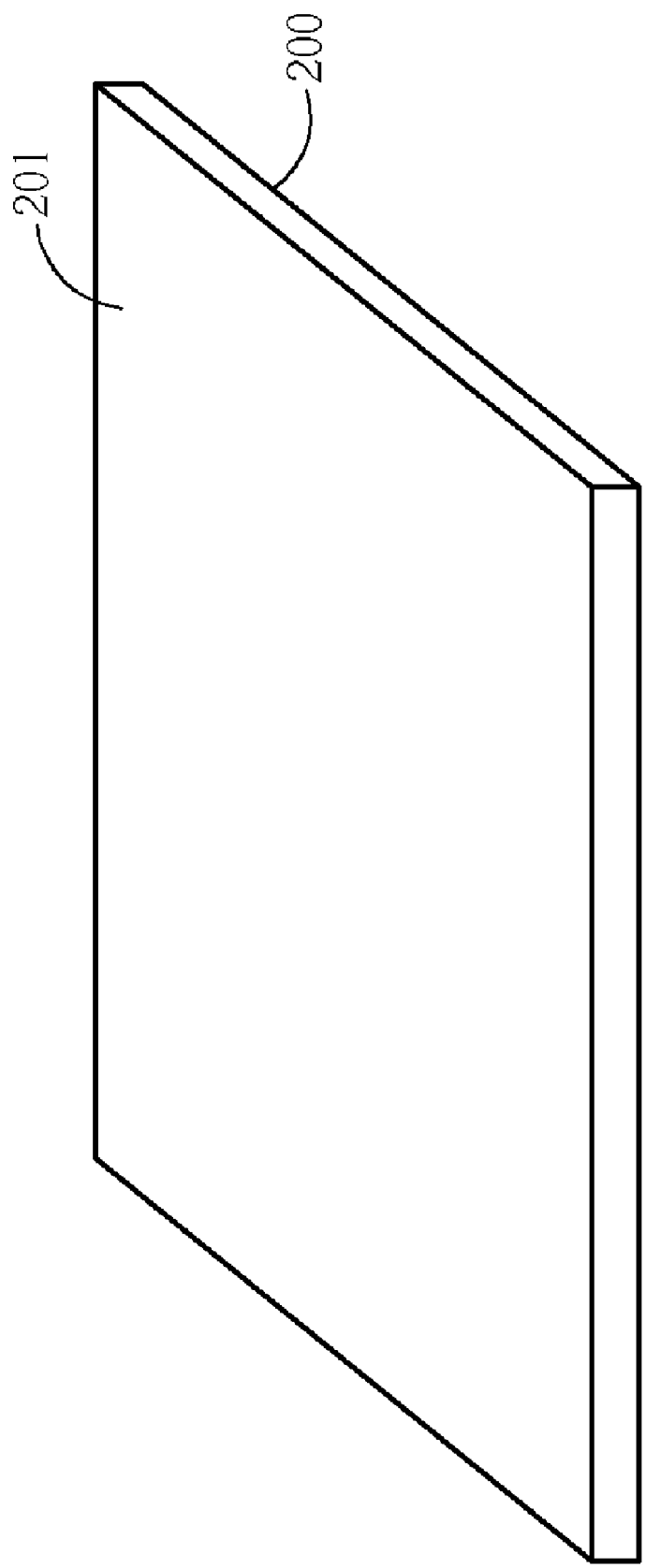
FIG. 2 through FIG. 7 are schematic diagrams of a process for manufacturing the LCD according to the present invention.
Figure 3:
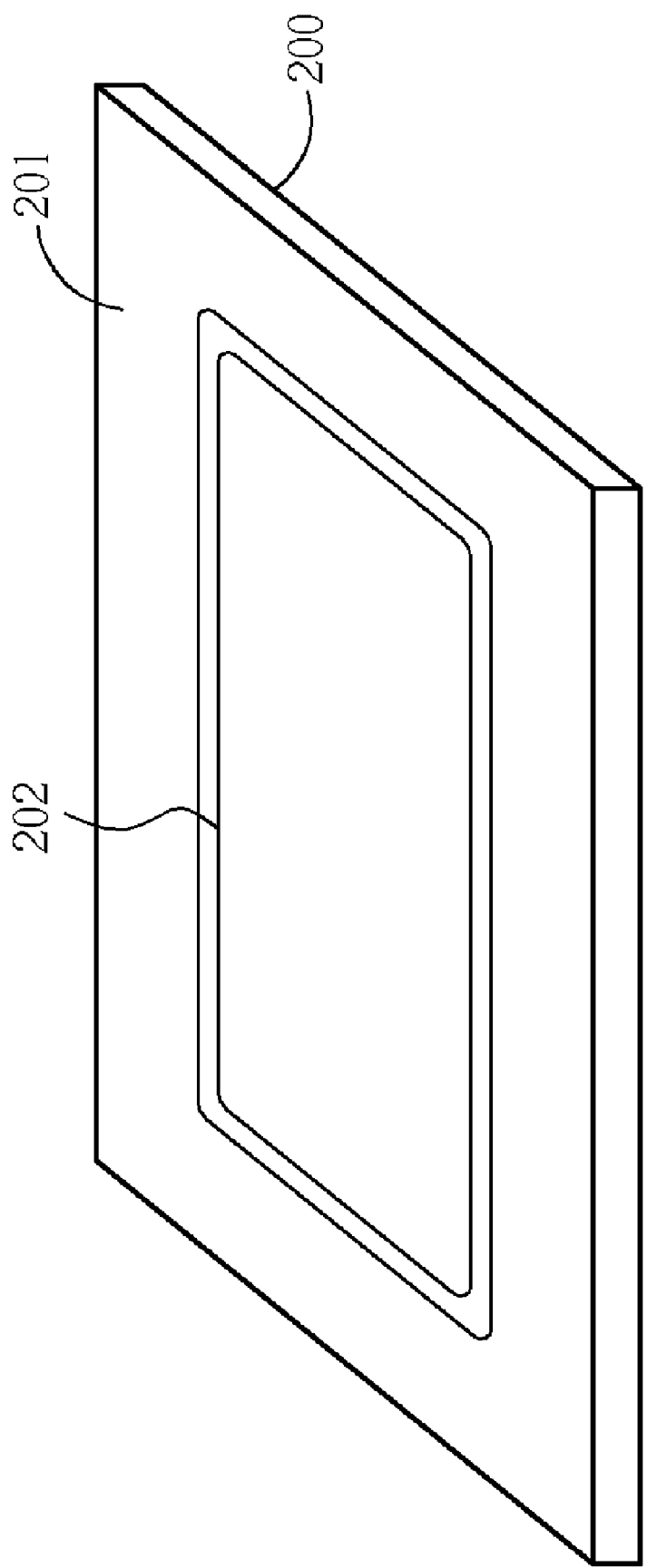

Please refer to FIG. 1 through FIG. 7. FIG. 1 is a flowchart of a method for manufacturing the LCD according to the present invention. FIG. 2 through FIG. 7 are schematic diagrams of a process for manufacturing the LCD according to the present invention. The LCD is manufactured mainly by a one drop fill process and a polymer stability alignment process. First, as shown in FIG. 2, a bottom substrate 200 is provided, and the bottom substrate 200 has a cleaned top surface 201. The cleaning method for the top surface 201 is well known by the ordinary skilled person in the art, and the method will not be described redundantly. Second, as shown in FIG. 3, a sealant 202 is applied on the top surface 201. The sealant 202 generally is a material for light curing or thermal curing, and the material only susceptible for light curing is preferred, such as ultraviolet (UV) curing sealant. Therefore, a step 100 shown in FIG. 1 is finished.

Figure 4:
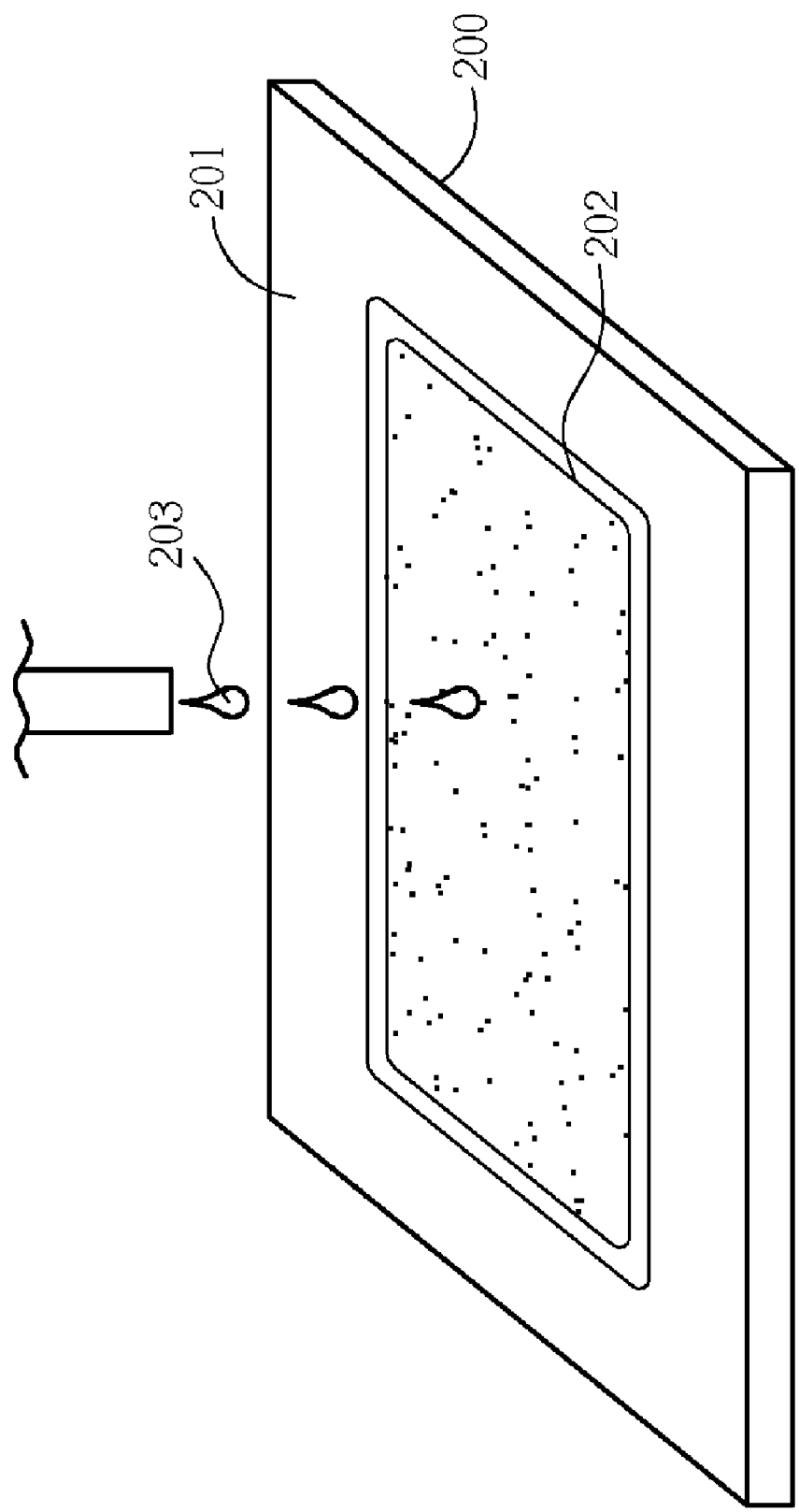

Then, a step 102 is performed. As shown in FIG. 4, The one drop fill (ODF) process is performed to provide a liquid crystal mixture 203 on the top surface 201 of the bottom substrate 200, so that the liquid crystal mixture 203 is surrounded by the sealant 202. For example, the liquid crystal mixture 203 is directly dropped on the bottom substrate 200. The liquid crystal mixture 203 comprises a liquid crystal material, such as vertical alignment liquid crystal material or negative liquid crystal material, and at least one reactive monomer. The reactive monomer is preferred to have a stable melting point and be able to be polymerized under an adapted condition. For example, the reactive monomer can be a photo-polymerizable or thermal-polymerizable reactive monomer. According to the method of the present invention, the usable reactive monomer can comprise a reactive monomer C1 as a compound of formula (1):

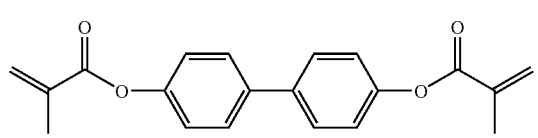

(1)

The melting point of the reactive monomer C1 is 150 to 160° C., and the reactive monomer C1 can be polymerized at a temperature in this range.

Figure 5:
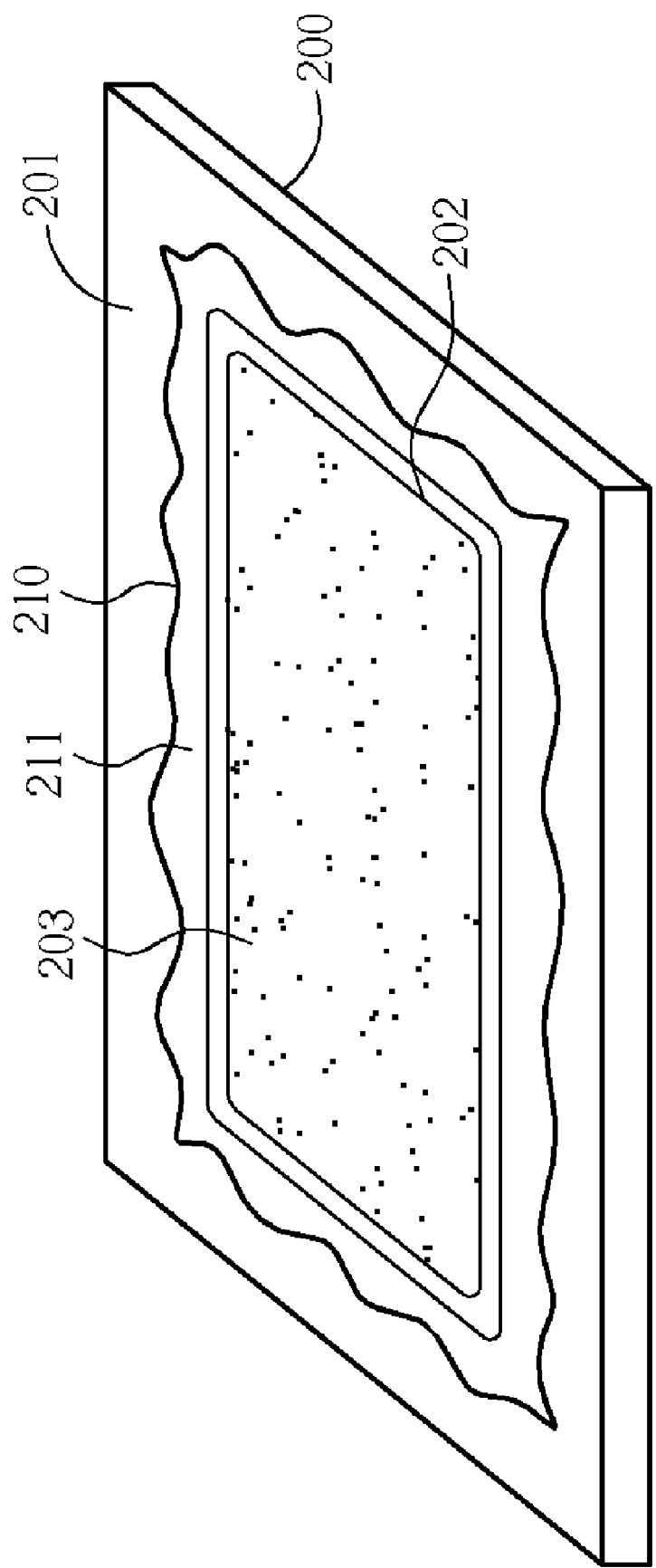

Next, a step 104 is performed. As shown in FIG. 5, a top substrate 210 is provided, and the top substrate 210 has a cleaned bottom surface 211. The sealant 202 and the bottom substrate 200 are covered with the bottom surface 211. After covering the sealant 202 and the bottom substrate 200 with the bottom surface 211, the liquid crystal mixture 203 is surrounded by the sealant 202. Usually, the sealant 202 and the bottom substrate 200 are covered with the top substrate 210 in a vacuum chamber.

After covering the sealant 202 and the bottom substrate 200 with the top substrate 210, a step 106 can be selectively performed. A pre-curing process of the sealant 202 is performed under an adapted condition, and the pre-curing process can be performed by a lighting method. For example, a pre-curing process can be performed at a first temperature or under a lighting condition to cure the sealant 202. The object of the pre-curing process is only to cure the sealant 202, so the condition of the pre-curing process is preferred that any one of the reactive monomer(s) in the liquid crystal mixture 203 cannot be substantially deteriorated during the pre-curing process. For example, the reactive monomer should have a melting point higher than the first temperature. In addition, depending on the requirement, a step 108 can be further performed. A liquid crystal alignment checking process is performed for the liquid crystal material in the liquid crystal mixture 203 so as to confirm whether the tilt angle of the liquid crystal molecules is correct or not.

Figure 6:
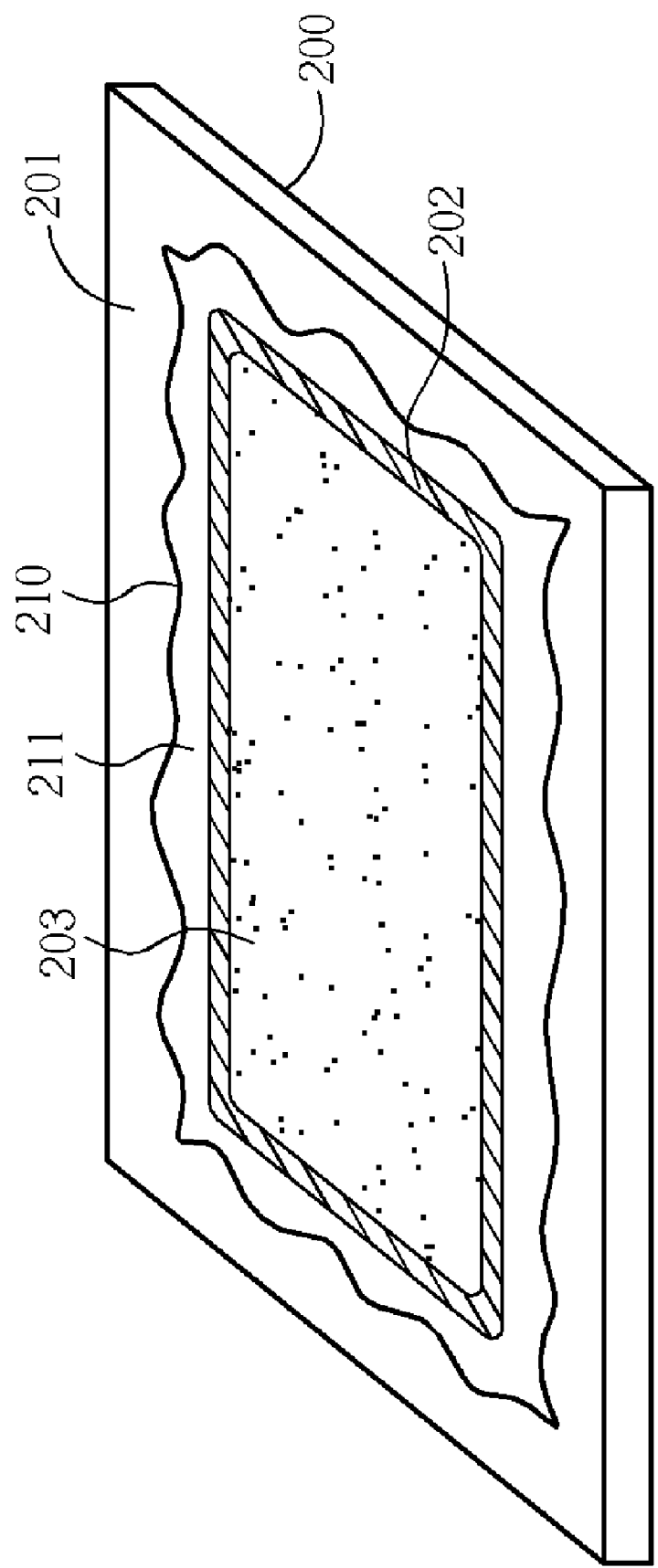

Furthermore, as shown in FIG. 6, a sealant-curing process of a step 110 is performed to cure the sealant 202. The sealant-curing process is preferred to use a heating method. For example, the curing process of the sealant 202 can be performed by heating in the curing oven having a third temperature. Generally, the third temperature can be 120 to 125° C. The object of sealant-curing process is only to cure the sealant 202, so the condition of the sealant-curing process is preferred that any one of the reactive monomer(s) in the liquid crystal mixture 203 cannot be substantially deteriorated during the sealant-curing process. For example, the reactive monomer has a curing temperature or a melting point higher than the third temperature, so that any one of the reactive monomer(s) will not be melted or cured to be deteriorated during the sealant-curing process.

Figure 7:
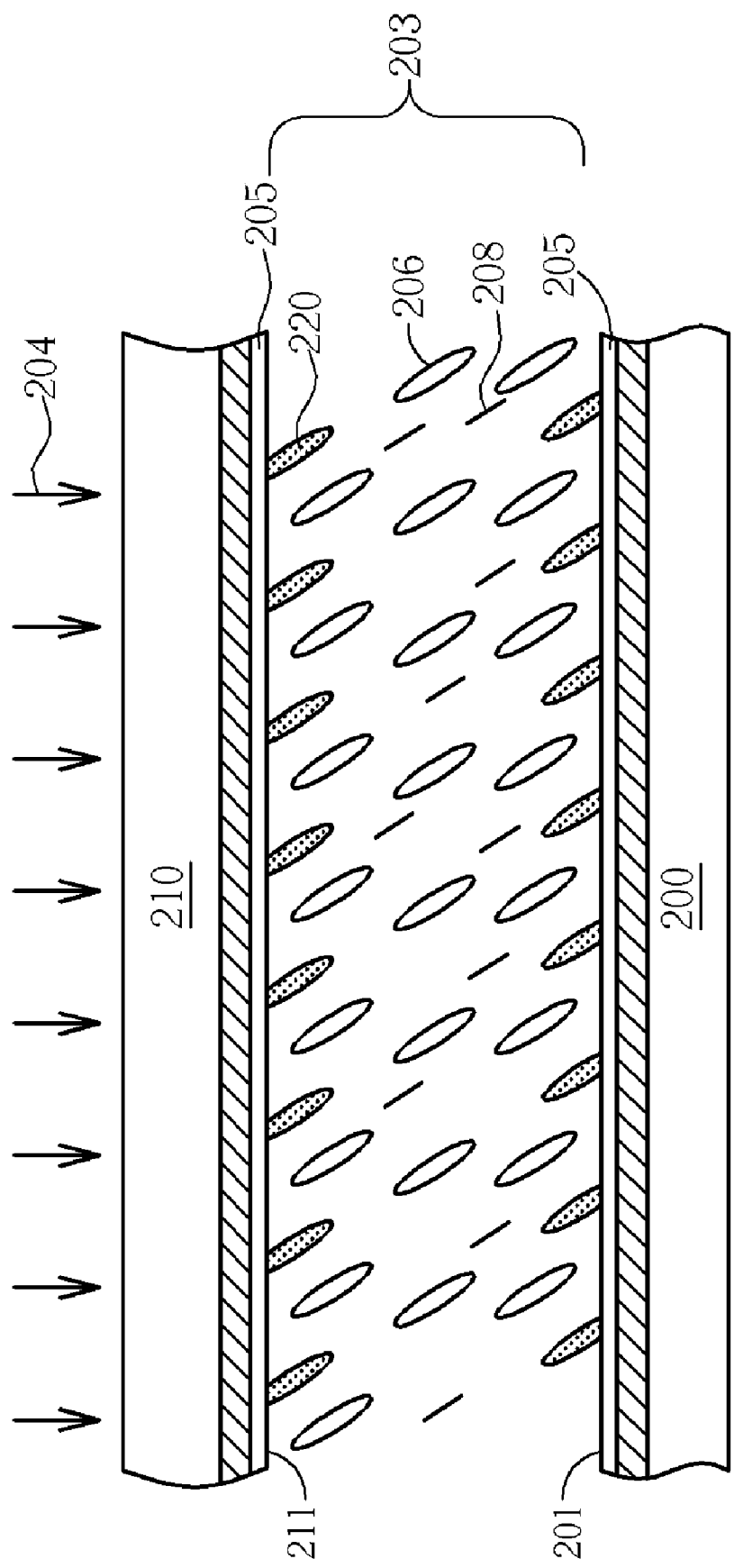

Next, a step 112 is performed. An active curing process 112 is performed under a heating condition at a second temperature or under a lighting condition to cure the reactive monomer, and then, the manufacture of the LCD is finished. The active curing process 112 can further comprises a polymer stability alignment process. FIG. 7 is a cross-sectional schematic diagram of the LCD according to the manufacturing method of the present invention. First, a voltage is applied to tilt the liquid crystal molecules 206 in the liquid crystal mixture 203 to a pre-determined angle. For example, the vertical alignment liquid crystal molecules 206 are tilted to be perpendicular to the surface of the bottom substrate 200. Then, an UV light is provided to illuminate the LCD, so that the polymerization and the phase separation of the reactive monomer 209 in the liquid crystal mixture 203 are gradually generated along the aligned direction of the liquid crystal molecules 206 to form a polymer 220 shown in FIG. 7. The polymer 220 is formed on an alignment film 205 of the top and bottom substrate 210, 200 along the aligned direction of the liquid crystal molecules 206.

Figure 8:
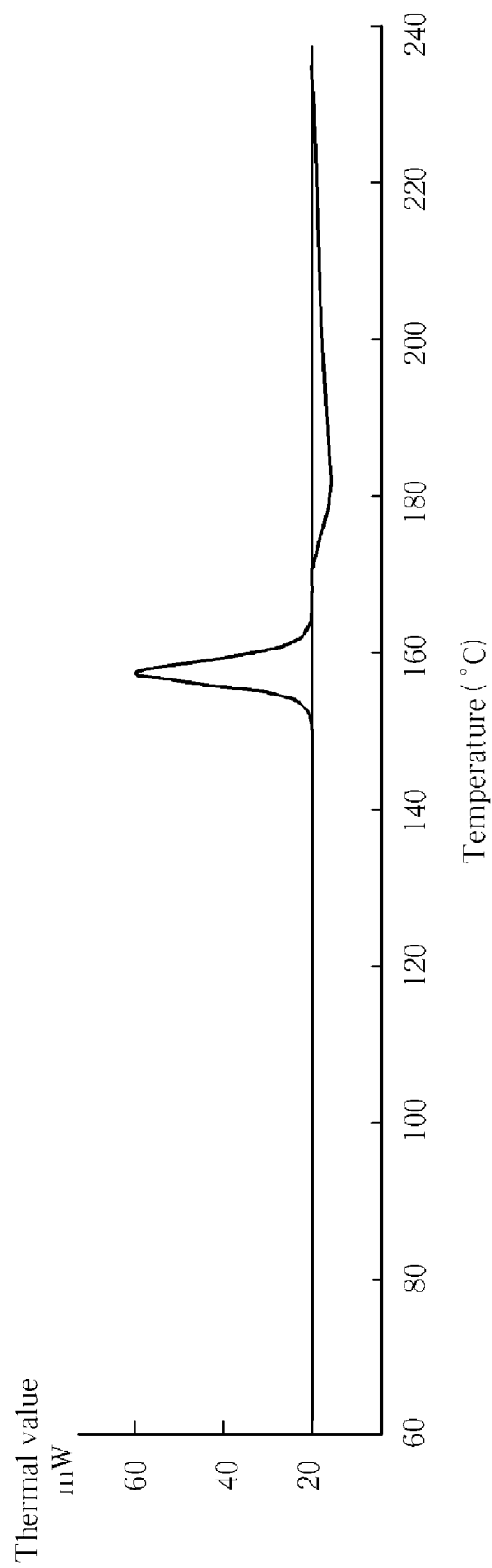
FIG. 8 shows a result tested through Differential Scanning Calorimetry.

As the aforementioned, the reactive monomer 209 in the liquid crystal mixture 203 is preferred to have a stable melting point and not to be substantially polymerized during the aforementioned pre-curing process or sealant-curing process. Therefore, the second temperature of performing the active curing process should be higher than the first temperature of the pre-curing process or the third temperature of the sealant-curing process so as to prevent the reactive monomer 209 from being cured or deteriorated during the pre-curing or sealant-curing process. For the aforementioned condition, the present invention chooses the aforementioned compound of formula (1) to be the reactive monomer 209 in the liquid crystal mixture 203. For example, FIG. 8 shows a result tested through Differential Scanning Calorimetry (DSC). The result shows that the reactive monomer 209 has a high melting point and good thermal stability. For example, the reactive monomer 209 in the liquid crystal mixture 203 has a melting point in the range of 150 to 160° C. higher than the third temperature of the sealant-curing process so as to be regarded as the reactive monomer 209 of the present invention.

Compared with the prior art, the present invention uses the pre-curing process and the sealant-curing process for curing the sealant. The pre-curing process and the sealant-curing process are performed at a temperature lower than the temperature for curing the reactive monomer. Therefore, the problem of causing the mura of the LCD by decomposing the reactive monomer having inferior thermal stability during curing process can be potentially prevented.

Those skilled in the art will readily observe that numerous modifications and alterations of the device and method may be made while retaining the teachings of the invention.

What is claimed is:

1. A method for manufacturing a liquid crystal display (LCD), comprising:
   providing a bottom substrate;
   applying a sealant on the top surface of the bottom substrate, wherein the sealant has a pre-curing temperature;
   providing a liquid crystal mixture comprising a vertical alignment liquid crystal material and at least one reactive monomer so that the liquid crystal mixture is surrounded by the sealant, the at least one reactive monomer having a melting point higher than 125° C., wherein the melting point of the reactive monomer is higher than the pre-curing temperature of the sealant;
   providing a top substrate so that the bottom surface of the top substrate covers the sealant and the bottom substrate;
   performing a pre-curing process to pre-cure the sealant at the pre-cure temperature; and
   performing an active curing process to polymerize the reactive monomer at an active curing temperature to form at least one polymer layer between the bottom substrate and the vertical alignment liquid crystal material, wherein the active curing temperature is higher than the pre-curing temperature.

2. The method of claim 1, further comprising performing a curing process to cure the sealant at a third temperature before performing the active curing process.

3. The method of claim 2, wherein the curing temperature of the reactive monomer is higher than the third temperature.

4. The method of claim 2, wherein the melting point of the reactive monomer is higher than the third temperature.

5. The method of claim 2, wherein the curing process is performed by a heating method.

6. The method of claim 1, wherein the pre-curing process is performed by a lighting method.

7. The method of claim 1, wherein the active curing process is performed by a lighting method.

8. The method of claim 1, wherein the active curing process is performed by a heating method.

9. The method of claim 1, wherein the vertical alignment liquid crystal is perpendicular to the surface of the bottom substrate before performing the active curing process.

10. The method of claim 1, wherein the process of covering the sealant and the bottom substrate with the bottom surface of the top substrate is performed in a vacuum chamber.

11. The method of claim 1, further comprising performing a liquid crystal alignment checking process after performing the pre-curing process.

12. The method of claim 1, wherein the reactive monomer is a photo-polymerizable or thermal-polymerizable reactive monomer.

13. The method of claim 1, wherein the sealant is an UV curing sealant.

14. The method of claim 1, wherein the active curing process comprises a polymer stability alignment (PSA) process.

15. The method of claim 14, wherein the step of the polymer stability alignment process comprises:

applying a voltage to the liquid crystal mixture to tilt the liquid crystal molecules in a pre-determined angle; and
polymerizing the reactive monomer at the active curing temperature to form the at least one polymer layer between the bottom substrate and the vertical alignment liquid crystal material.

16. The method of claim 1, wherein the pre-curing temperature of the sealant is lower than 120° C.

17. The method of claim 1, wherein the melting point of the reactive monomer is in a range from 150° C. to 160° C.

18. The method of claim 17, wherein the reactive monomer comprises a compound of formula (1)

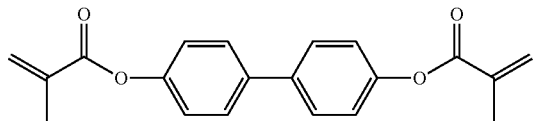

(1)

19. The method of claim 2, wherein the third temperature to cure the sealant is in a range from 120° C. to 125° C.

20. A method for manufacturing a liquid crystal display (LCD), comprising the steps of:
   providing a bottom substrate;
   applying a sealant on the top surface of the bottom substrate, wherein the sealant has a pre-curing temperature, wherein the pre-curing temperature of the sealant is lower than 120° C.;
   providing a liquid crystal mixture comprising a vertical alignment liquid crystal material and at least one reactive monomer so that the liquid crystal mixture is surrounded by the sealant, the at least one reactive monomer having a melting point higher than 125° C., wherein the reactive monomer comprises a compound of formula (1)

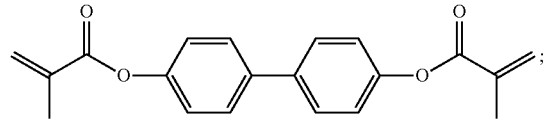

(1)

providing a top substrate so that the bottom surface of the top substrate covers the sealant and the bottom substrate;
performing a pre-curing process to pre-cure the sealant at the pre-curing temperature; and
performing an active curing process to polymerize the reactive monomer at an active curing temperature to form at least one polymer layer between the bottom substrate and the vertical alignment liquid crystal material, wherein the active curing temperature is higher than the pre-curing temperature.

* * * * *